3,050,912
MOUNTING CONSTRUCTION FOR MACHINE TOOL MEMBER
Jacob Decker, Cincinnati, Ohio, assignor to The Cincinnati Milling Machine Co., Cincinnati, Ohio, a corporation of Ohio
Filed May 18, 1959, Ser. No. 814,083
5 Claims. (Cl. 51—237)

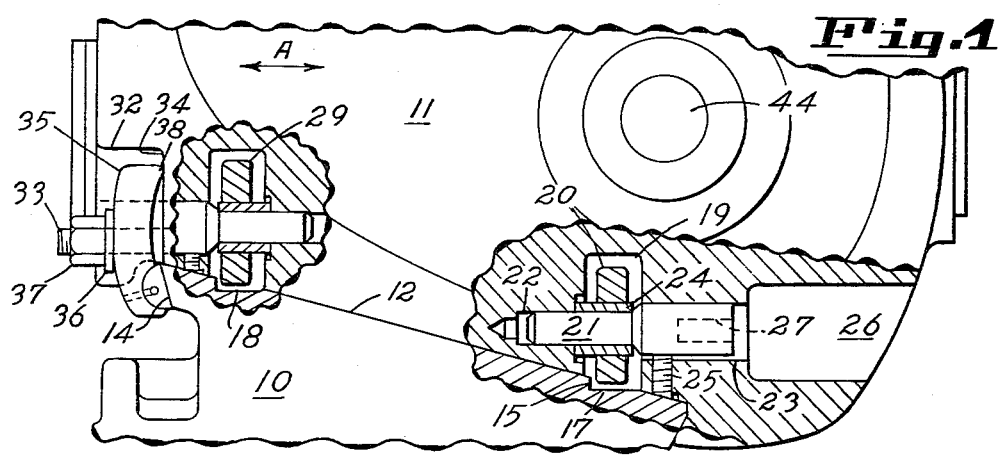
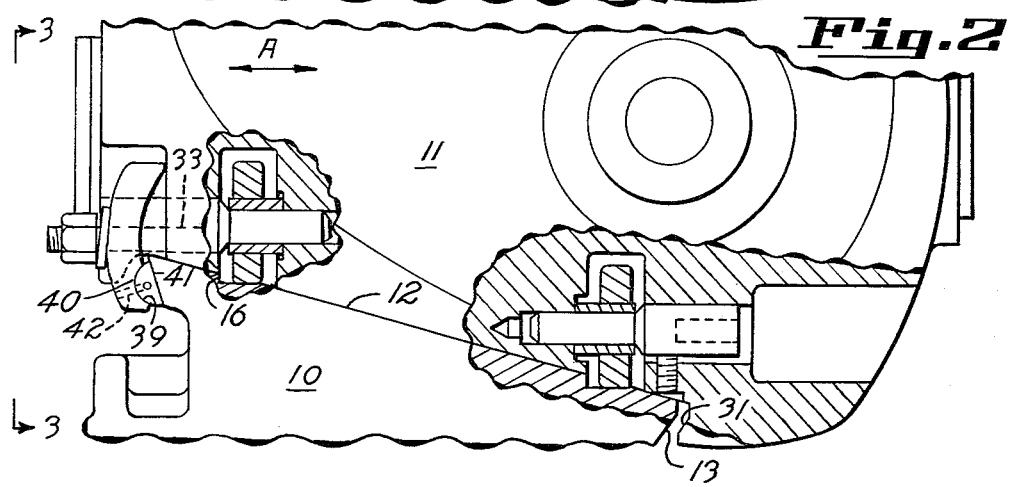
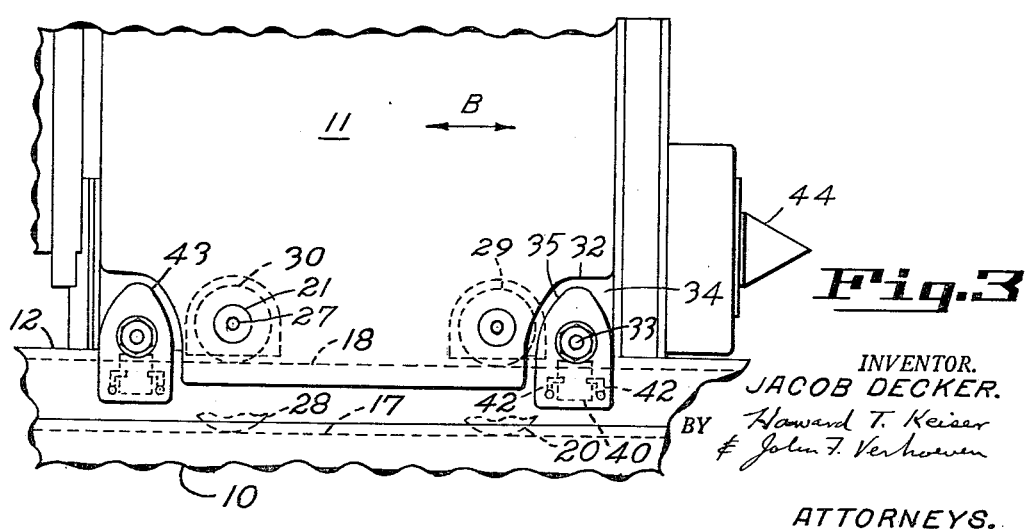
INVENTOR.
JACOB DECKER.

The present invention relates to a construction for mounting a member in a machine tool particularly suitable for the mounting of a heavy headstock on a bed.

Many machine tool members, such as the headstock in a grinding machine, must be mounted for clamping in a fixed position but must be movable when desired, as, for example, to accommodate different size workpieces. It is desirable that the member be rigidly secured in a fixed position when clamped and freely movable when adjustment of the fixed position is desired.

In the present invention there is provided a construction wherein a machine tool member, such as a headstock, is shifted laterally on a supporting member defining a way for selective engagement or disengagement of at least one roller, associated with the headstock, with a track, associated with the supporting member. When the headstock is in one lateral position the roller is disengaged from the track and the headstock may be firmly clamped to the supporting member, solidly seated on the way thereof. When the headstock is shifted laterally to a second position the roller engages the track and the member may be easily moved longitudinally on the way.

It is therefore an object of the present invention to mount a machine tool member so that it can be securely held in a fixed position but is easily movable, when desired, along a way to an adjusted position.

Other objects and advantages of the present invention should be readily apparent by reference to the following specification, considered in conjunction with the accompanying drawings forming a part thereof, and it is to be understood that any modifications may be made in the exact structural details thereshown and described, within the scope of the appended claims, without departing from or exceeding the spirit of the invention.

In the drawings:

FIG. 1 is a view looking along the bed of a machine tool, partly in cross-section, showing a headstock clamped in a fixed position thereon;

FIG. 2 is a view oriented as the view in FIG. 1 showing the headstock shifted laterally from the position of FIG. 1 released for longitudinal movement on the bed towards or away from the viewer;

FIG. 3 is a view, reduced in size, along the line 3—3 of FIG. 2.

In FIG. 1 there is shown at 10, a bed or supporting member of a machine tool, which could, for example, be the table of a grinding machine, upon which is mounted a headstock shown generally at 11. The bed has an upper surface 12 defining a way which is inclined in the lateral direction, indicated by arrow A in FIGS. 1 and 2, and extends in the longitudinal direction, indicated by arrow B in FIG. 3. The bed has extending longitudinally a locating surface 13 on one side and a clamping surface 14 on the opposite side. Slots 15 and 16, cut in the way 12, extend longitudinally and have a flat bottom surface 17 and 18, respectively, sunk below the way, said surfaces defining tracks relative to which the way 12 is inclined in the lateral direction. The tracks, which are spaced laterally and parallel to each other, are parallel to the way 12 in the longitudinal direction, as shown in FIG. 3.

The headstock has a recess 19 in which is mounted a roller 20. An axle 21 extends through the recess and is supported on each side thereof in laterally extending bores 22 and 23, respectively. A bushing 24 is mounted on the axle 21 in the recess 19 and receives the roller 20 thereon. Set screw 25 engages the axle in bore 23 to secure the axle in position. The roller 20 depends from the headstock 11 and is received in slot 15 in registration with track 17. Another roller 28, spaced longitudinally from roller 20, is also in registration with that track. Rollers 29 and 30, longitudinally spaced from each other and opposite rollers 20 and 28, are received in slot 16 in registration with track 18. The rollers 28, 29, and 30 may be similar to roller 20 and mounted similary thereto and will not be further described. On one side of the headstock the axles 21 extend to the outer surface thereof and, on the other side of the headstock, recesses 26 are provided for access thereto. The axles have threaded bores 27 in their outer ends to facilitate their removal from the headstock.

On one side of the headstock is a depending surface 31 parallel to, and adapted to engage, the locating surface 13 of the bed. On the opposite side the headstock is recessed at 32. A stud 33 mounted in the headstock extends from the recess surface 34. A forward clamp 35, washer 36 and nut 37 are received on the stud 33. The clamp is loosely received on the stud so that it may be tilted relative thereto. The clamp 35 has an upper protruding portion 38 adapted to engage surface 34 and includes a shoe 40 received in a socket 39 in the lower portion of the clamp. The shoe has one surface mating with a semi-circular surface in the socket and has a flat inner surface 41 adapted to engage the clamping surface 14. The shoe is held in socket 39 by bent pins 42 secured in the clamp 35 and received in the ends of the shoe 40. With this mounting the shoe can pivot in the socket and the surface 41 thereof can be aligned for full engagement with clamping surface 14 despite any inclination of the clamp member 35. A rear clamp 43 is similarly constructed and mounted and will not be further described. The headstock also has a center 44 extending forwardly from the headstock in the longitudinal direction and adapted to engage a workpiece to support the same for an operation thereon.

When the nut 37 is tightened on stud 33 the headstock is shifted laterally and drawn up the inclined way 12 since the bottom of the clamp is engaged with the fixed bed and the force pulling the headstock stud 33 out through the clamp exceeds the force exerted by the clamp portion 38 against the headstock. To clamp the headstock in a fixed position on the bed the nut is tightened until surface 31 of the headstock engages locating surface 13 of the bed. With the headstock shifted into this lateral position the rollers are disengaged from the tracks and the headstock seats solidly on the way 12 with the full weight of the headstock resting thereon, as shown in FIG. 1. The headstock is firmly clamped in this fixed position by engagement of the surfaces 13 and 31 on one side, and by engagement of surfaces 41 and 14 on the other side. It will be noted that as the headstock is drawn up the way, the surface 41 of the shoe pivots to maintain full contact with clamping surface 14.

When it is desired to move the headstock longitudinally to another position, as for example, when disengaging the center 44 from a workpiece or shifting the center 44 longitudinally to accommodate a workpiece of different length, the nut 37 is loosened to loosen, or release, the clamp. This permits the headstock to slide down the inclined way to a lateral position where the rollers engage the tracks, as shown in FIGS. 2 and 3. After this lateral shifting of the headstock, the weight of the headstock is supported by the rollers which constitute antifriction means by which the headstock is easily moved longitudinally along the tracks.

There has thus been provided a novel construction by which a machine tool member can be firmly and solidly clamped in a fixed position and yet, despite its weight, be moved easily to any desired adjusted position.

What is claimed is:

1. In a machine tool a bed having a laterally inclined upper surface defining a way and having a pair of spaced parallel longitudinal slots therein, each slot having a flat bottom surface defining a track parallel to the way in the longitudinal direction and relative to which the way is inclined in the lateral direction, a member mounted on the way having a plurality of rollers mounted therein and depending therefrom, said rollers received in the slots in the way, and a clamp connected to one side of the member and engaged with one side of the bed to slide the member up the way and to hold the member up on the way with the rollers disengaged from the tracks, said member slidable down the way on release of the clamp to engage the rollers with the track for longitudinal movement of the member along the bed.

2. In a machine tool a bed having a laterally inclined upper surface defining a way and having a pair of spaced parallel longitudinally extending slots therein, each slot having a flat bottom surface defining a track parallel to the way in the longitudinal direction and relative to which the way is inclined in the lateral direction, the bed having a locating surface on one side thereof, a headstock mounted on the way having a plurality of spaced rollers mounted therein and depending therefrom, said rollers received in the slots in the way, the headstock having a surface on one side parallel to said locating surface, and a clamp connected to the other side of the headstock and engaged with the other side of the bed to hold the headstock clamped up on the way with said surface thereof engaged with the locating surface on the bed and with the rollers disengaged from the track, said headstock slidable laterally down the way on release of the clamp to disengage said surface of the headstock from the locating surface of the bed and to engage the rollers with the track for free longitudinal movement of the headstock on the bed.

3. In a machine tool a bed having a laterally inclined flat upper surface defining a way and having a pair of spaced parallel longitudinally extending slots cut therein, each slot having a flat bottom surface defining a track parallel to the way in the longitudinal direction and relative to which the way is inclined in the lateral direction, the bed having a locating surface on one side thereof and a clamping surface on the opposite side thereof, a headstock mounted on the way having a plurality of spaced rollers on fixed axes mounted therein and depending therefrom, said rollers received in the slots in the way, the headstock having a depending surface on one side parallel to said locating surface, a clamp connected to the other side of the headstock having a pivotal shoe with a surface adapted to engage the clamping surface of the bed, means to tighten the clamp and to urge the shoe against the clamping surface of the bed, drawing said headstock laterally up the way to engage the headstock surface with the locating surface on the bed and to disengage the rollers from the track, the headstock slidable laterally down the way on loosening of said clamp to disengage the headstock surface from the locating surface on the bed and to engage the rollers with the track for longitudinal movement of the headstock on the bed.

4. In a machine tool, a supporting member having a way and a pair of longitudinally extending parallel tracks, said way inclined laterally relative to the tracks and extended parallel to the tracks, a member mounted on the way having a pair of spaced rollers carried thereby, said member slidable down the way to effect engagement of the rollers with the tracks, and means to slide said member up the way to disengage the rollers from the tracks.

5. In a machine tool, a bed having a way and spaced longitudinally extending tracks sunk therein, said way inclined laterally relative to the tracks and extended parallel to the tracks, a member mounted on the way having a plurality of spaced rollers mounted therein and protruding therefrom in registration with the tracks, said member slidable down the way to effect engagement of the rollers with the tracks, and means to slide said member up the way to disengage the rollers from the tracks and effect locking engagement with the bed to hold the member upon the way.

References Cited in the file of this patent

UNITED STATES PATENTS

| | | |
|---|---|---|
| 185,682 | Johnson | Dec. 26, 1876 |
| 2,497,504 | Kronouer | Feb. 14, 1950 |
| 2,540,586 | Lauterbur et al. | Feb. 6, 1951 |
| 2,612,014 | Mathewson | Sept. 30, 1952 |